US011010613B2

(12) United States Patent
Yu

(10) Patent No.: US 11,010,613 B2
(45) Date of Patent: May 18, 2021

(54) SYSTEMS AND METHODS FOR TARGET IDENTIFICATION IN VIDEO

(71) Applicant: BEIJING DIDI INFINITY TECHNOLOGY AND DEVELOPMENT CO., LTD., Beijing (CN)

(72) Inventor: Guangda Yu, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 17/010,931

(22) Filed: Sep. 3, 2020

(65) Prior Publication Data

US 2020/0401811 A1   Dec. 24, 2020

Related U.S. Application Data

(63) Continuation of application No. PCT/CN2018/118187, filed on Nov. 29, 2018.

(51) Int. Cl.
*G06K 9/00* (2006.01)
*G06N 3/08* (2006.01)

(52) U.S. Cl.
CPC ..... *G06K 9/00744* (2013.01); *G06K 9/00718* (2013.01); *G06N 3/08* (2013.01); *G06T 2207/10016* (2013.01)

(58) Field of Classification Search
CPC ........... G06K 9/00744; G06K 9/00718; H04N 21/44008; G06N 3/08; G06T 2207/10016
USPC .................................................. 382/103, 224
See application file for complete search history.

(56) References Cited

U.S. PATENT DOCUMENTS

| 6,724,915 B1 * | 4/2004 | Toklu ...................... G06T 7/248 382/103 |
| 8,131,012 B2 | 3/2012 | Eaton et al. |
| 8,948,454 B2 | 2/2015 | Datta et al. |
| 2013/0101166 A1 | 4/2013 | Holeva et al. |

(Continued)

FOREIGN PATENT DOCUMENTS

| CN | 101770568 A | 7/2010 |
| CN | 102163280 A | 8/2011 |

(Continued)

OTHER PUBLICATIONS

International Search Report in PCT/CN2018/118187 dated Aug. 27, 2019, 5 pages.

(Continued)

*Primary Examiner* — Daniel G Mariam
(74) *Attorney, Agent, or Firm* — Metis IP LLC

(57) ABSTRACT

The present disclosure relates to systems and methods for target identification in a video. The method may include obtaining a video including a plurality of frames of video data. The method may further include sampling, from the plurality of frames, each pair of consecutive sampled frames being spaced apart by at least one frame of the plurality of frames of the video data. The method may further include identifying, from the one or more sampled frames, a reference frame of video data using an identification model. The method may still further include determining a start frame and an end frame including the target object.

20 Claims, 8 Drawing Sheets

(56) References Cited

U.S. PATENT DOCUMENTS

| | | | |
|---|---|---|---|
| 2014/0198945 A1* | 7/2014 | Hsiao | ............... G06T 7/246 382/103 |
| 2016/0205446 A1 | 7/2016 | Cai | |
| 2017/0286774 A1 | 10/2017 | Gaidon | |

FOREIGN PATENT DOCUMENTS

| | | |
|---|---|---|
| CN | 103227916 A | 7/2013 |
| CN | 105025360 A | 11/2015 |
| CN | 106127114 A | 11/2016 |
| CN | 106469293 A | 3/2017 |
| CN | 107221151 A | 9/2017 |
| CN | 107256413 A | 10/2017 |

OTHER PUBLICATIONS

Written Opinion in PCT/CN2018/118187 dated Aug. 27, 2019, 4 pages.

* cited by examiner

SYSTEMS AND METHODS FOR TARGET IDENTIFICATION IN VIDEO

CROSS-REFERENCE TO RELATED APPLICATIONS

This application is a continuation of International Application No. PCT/CN2018/118187, filed on Nov. 29, 2018, the entire contents of which are hereby incorporated by reference.

TECHNICAL FIELD

The present disclosure generally relates to video content analytics, and more particularly, relates to systems and methods for identifying a target object in a video.

BACKGROUND

In an era of big data, the volume of data available for analysis increases dramatically. For example, with the development of high-definition cameras, videos are encoded with a higher frame rate (e.g., 48 frames per second (fps), 60 fps, etc.). It is time-consuming to identify a target object and determine a time period in which the target object appears in a video frame-by-frame. Therefore, it is desirable to develop a system or a method for determining a time period and/or a portion of the video in which the target object appears in a video with higher efficiency and accuracy.

SUMMARY

According to an aspect of the present disclosure, a method for target identification in a video is provided. The method is implemented on a computing apparatus having at least one processor and at least one computer-readable storage device. The method may comprise obtaining a video including a plurality of frames of video data, each frame of the plurality of frames corresponding to a time point; sampling, from the plurality of frames, each pair of consecutive sampled frames being spaced apart by at least one frame of the plurality of frames of the video data; identifying, from the one or more sampled frames, a reference frame of video data, the reference frame including a target object that is identified using an identification model; determining a start frame including the target object by scanning each of at least a portion of preceding frames of the reference frame sequentially in a first direction in time; and determining an end frame including the target object by scanning each of at least a portion of subsequent frames of the reference frame sequentially in a second direction in time, the second direction in time being opposite to the first direction in time.

According to another aspect of the present disclosure, a system for target identification in a video is provided. The system may include at least one storage device storing a set of instructions; and at least one processor configured to communicate with the at least one storage device, wherein when executing the set of instructions, the at least one processor is directed to obtain a video including a plurality of frames of video data, each frame of the plurality of frames corresponding to a time point; sample, from the plurality of frames, each pair of consecutive sampled frames being spaced apart by at least one frame of the plurality of frames of the video data; identify, from the one or more sampled frames, a reference frame of video data, the reference frame including a target object that is identified using an identification model; determine a start frame including the target object by scanning each of at least a portion of preceding frames of the reference frame sequentially in a first direction in time; and determine an end frame including the target object by scanning each of at least a portion of subsequent frames of the reference frame sequentially in a second direction in time, the second direction in time being opposite to the first direction in time.

According to a further aspect of the present disclosure, a non-transitory computer readable medium for target identification in a video is provided. The non-transitory computer readable medium may include at least one set of instructions, wherein when executed by one or more processors of a computing apparatus, the at least one set of instructions causes the computing apparatus to perform a method. The method may comprise obtaining a video including a plurality of frames of video data, each frame of the plurality of frames corresponding to a time point; sampling, from the plurality of frames, each pair of consecutive sampled frames being spaced apart by at least one frame of the plurality of frames of the video data; identifying, from the one or more sampled frames, a reference frame of video data, the reference frame including a target object that is identified using an identification model; determining a start frame including the target object by scanning each of at least a portion of preceding frames of the reference frame sequentially in a first direction in time; and determining an end frame including the target object by scanning each of at least a portion of subsequent frames of the reference frame sequentially in a second direction in time, the second direction in time being opposite to the first direction in time.

In some embodiments, the identification model may include a convolutional neural network (CNN) model.

In some embodiments, the identifying the target object in the reference frame of the video data using an identification model may include obtaining an identification model and training data related to the target object; determining a trained identification model by training the identification model with the training data related to the target object; and identifying, from the one or more sampled frames, the reference frame including the target object using the trained identification model.

In some embodiments, a preceding frame of the reference frame may correspond to a time point earlier than a reference time point corresponding to the reference frame.

In some embodiments, the first direction in time may be from a later time point of the video to an earlier time point of the video.

In some embodiments, a subsequent frame of the reference frame may correspond to a time point later than a reference time point corresponding to the reference frame.

In some embodiments, the second direction in time may be from an earlier time point of the video to a later time point of the video.

In some embodiments, the determining a start frame including the target object by scanning each of at least a portion of preceding frames of the reference frame sequentially in a first direction in time may include determining a candidate start frame including the target object by scanning each of the at least a portion of the preceding frames of the reference frame along the first direction in time, wherein the target object is not identified in the frame immediately preceding the candidate start frame; scanning each of a first count of preceding frames of the candidate start frame; and determining the start frame by determining whether the target object appears in any one of the first count of the preceding frames of the candidate start frame.

In some embodiments, the determining the start frame by determining whether the target object appears in any one of the first count of the preceding frames of the candidate start frame may further include determining that the target object appears in at least one of the first count of the preceding frames of the candidate start frame; and in response to the determination that the target object appears in at least one of the first count of the preceding frames of the candidate start frame, identifying the start frame by scanning each of preceding frames of a first preceding frame of the candidate start frame, the first preceding frame of the candidate start frame corresponding to an earliest time point among the first count of the preceding frames of the candidate start frame in which the target object is identified.

In some embodiments, the determining the start frame by determining whether the target object appears in any one of the first count of the preceding frames of the candidate start frame may further include determining that the target object does not appear in any one of the first count of the preceding frames of the candidate start frame; and in response to the determination that the target object does not appear in any one of the first count of the preceding frames of the candidate start frame, designating the candidate start frame as the start frame.

In some embodiments, the method may further include determining the first count of the preceding frames of the candidate start frame based on at least one criterion including a threshold count of the preceding frames of the candidate start frame to be scanned, a threshold time period within which corresponding preceding frames of the candidate start frame are to be scanned, or until the target object is identified in one of the preceding frames of the candidate start frame.

In some embodiments, the determining an end frame including the target object by scanning each of at least a portion of subsequent frames of the reference frame sequentially in a second direction in time may include determining a candidate end frame including the target object by scanning each of the at least a portion of the subsequent frames of the reference frame along the second direction in time, wherein the target object is not identified in the frame immediately following the candidate end frame; scanning each of a second count of subsequent frames of the candidate end frame; and determining the end frame by determining whether the target object appears in any one of the second count of the subsequent frames of the candidate end frame.

In some embodiments, the determining the end frame by determining whether the target object appears in any one of the second count of the subsequent frames of the candidate end frame may further include determining that the target object appears in at least one of the second count of the subsequent frames of the candidate end frame; and in response to the determination that the target object appears in at least one of the second count of the subsequent frames of the candidate end frame, identifying the end frame by scanning each of subsequent frames of a second subsequent frame of the candidate end frame, the second subsequent frame of the candidate end frame corresponding to a latest time point among the second count of the subsequent frames of the candidate end frame in which the target object is identified.

In some embodiments, the determining the end frame by determining whether the target object appears in any one of the second count of the subsequent frames of the candidate end frame may further include determining that the target object does not appear in any one of the second count of the subsequent frames of the candidate end frame; and in response to the determination that the target object does not appear in any one of the second count of the subsequent frames of the candidate end frame, designating the candidate end frame as the end frame.

In some embodiments, the method may further include determining the second count of the subsequent frames of the candidate end frame based on at least one criterion including a threshold count of the subsequent frames of the candidate end frame to be scanned, a threshold time period within which corresponding subsequent frames of the candidate end frame are to be scanned, or until the target object is identified in one of the subsequent frames of the candidate end frame.

In some embodiments, the method may further include determining a time period in which the target object appears in the video based on the start frame and the end frame.

In some embodiments, the determining the time period in which the target object appears in the video based on the start frame and the end frame may include obtaining a start time point corresponding to the start frame including the target object; obtaining an end time point corresponding to the end frame including the target object; and determining the time period that the target object appears in the video based on the start time point and the end time point.

In some embodiments, the obtaining a video including a plurality of frames of video data may include obtaining the video including the plurality of frames of video data by communicating with an information provider over a network, wherein the information provider connects to the computing apparatus through the network.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
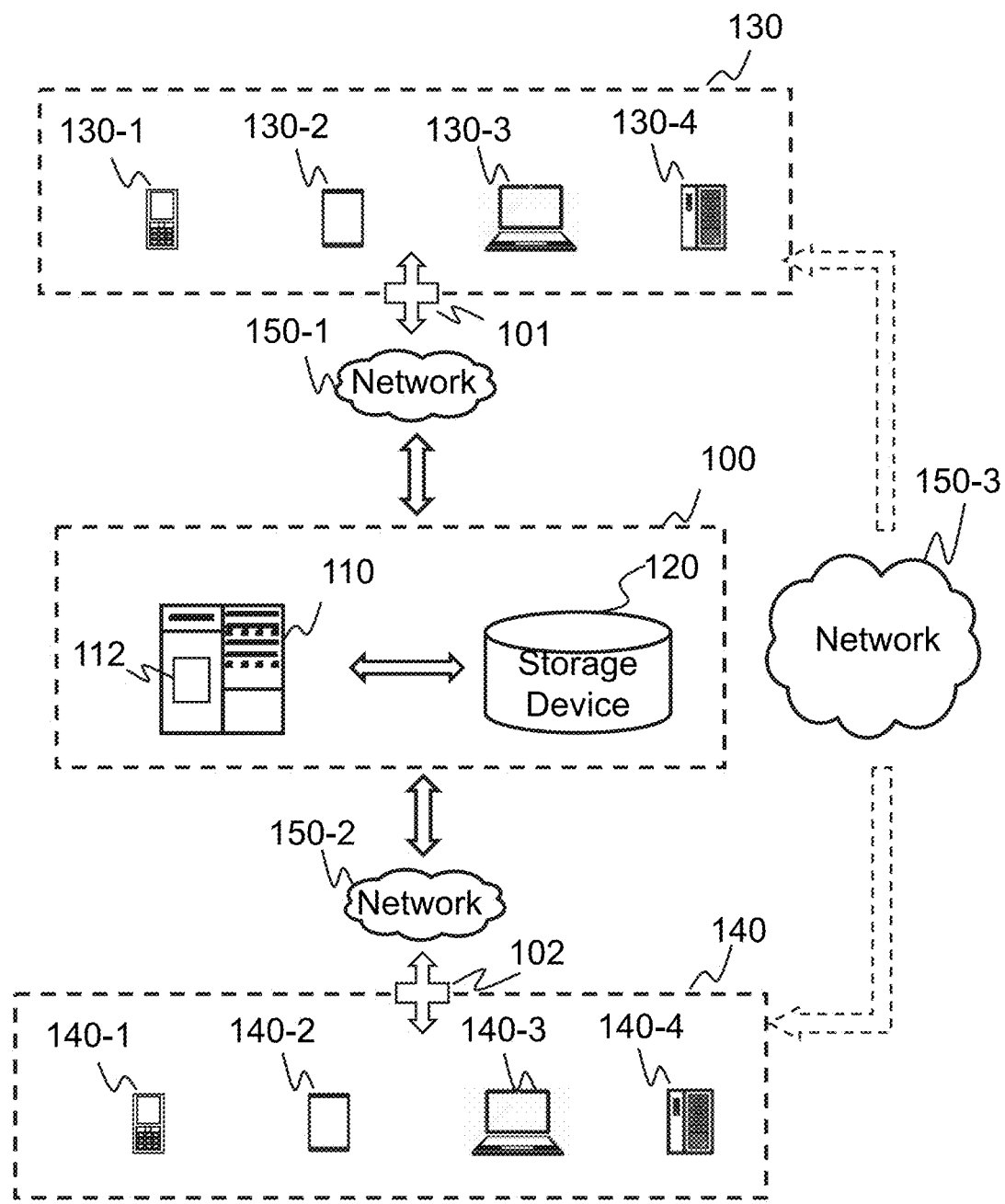
FIG. 1 is a schematic diagram illustrating an exemplary target identification system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

Some embodiments of the present disclosure are directed to systems and methods for target identification in a video. The system may identify a frame including a target object during a frame-skipping sampling process. The system may scan, sequentially in two directions in time, each of at least a portion of preceding frames (or referred to as a forward scanning) and/or each of at least a portion of subsequent frames (or referred to as a backward scanning) of the identified frame including the target object (also referred to as "reference frame") to determine a start frame including the target object and an end frame including the target object. The system may determine a time period in which the target object appears in the video based on the start frame and the end frame. The frame-skipping sampling process during which the reference frame is identified in combination of the forward scanning and backward scanning to identify the start frame and the end frame may accelerate the process for identifying a portion of the video or a time period in which the target object appears in the video. In some embodiments, the accuracy of the process may be improved by way of a redundant scan. A redundant scan may include a redundant forward scan and a redundant backward scan. As used herein, a redundant forward scan refers to a process in which after a candidate start frame is identified, each of a few more preceding frames of the candidate start frame may be scanned to determine if the target object appears in any one of the scanned preceding frames of the candidate start frame and determine the start frame accordingly. The redundant forward scan may be part of the forward scan. As used herein, a redundant backward scan refers to a process in which after a candidate end frame is identified, each of a few more subsequent frames of the candidate end frame may be scanned to determine if the target object appears in any one of the scanned subsequent frames of the candidate end frame and determine the end frame accordingly. The redundant backward scan may be part of the backward scan.

Some embodiments of the present disclosure are directed to a real-time or online target identification service applicable in, e.g., security surveillance, which is a newly emerged service or demand rooted only in the post-Internet era. It provides the technical solutions to service requesters that could rise only in the post-Internet era. In the pre-Internet era, it is impossible to identify a target object in real time or online in a video transmitted via a network. Therefore, the present solution is deeply rooted in and aimed to solve a problem only occurred in the post-Internet era.

FIG. 1 is a schematic diagram illustrating an exemplary target identification system according to some embodiments of the present disclosure. The target identification system 100 may be a platform for data and/or information processing, for example, identifying a target object in a video. The target identification system 100 may include a data exchange port 101, a data transmitting port 102, a server 110, and a storage device 120. The server 110 may include a processing device 112. In some embodiments, the target identification system 100 may interact with an information provider 130 and a communication platform 140 via the data exchange port 101 and the data transmitting port 102, respectively. For example, the target identification system 100 may access information and/or data stored in the information provider 130 via the data exchange port 101. As another example, the server 110 may send information and/or data to a communication platform 140 via the data transmitting port 102.

The server 110 may process information and/or data relating to target identification in a video. For example, the server 110 may receive a video including a plurality of frames of video data from the information provider 130, and identify one or more target objects (e.g., a word, a human face, a fingerprint, a vehicle, a building, an animal, etc.) from one or more frames of video data. As another example, the server 110 may determine a time period in which a target object appears in the video based on the identified frames. In some embodiments, the server 110 may be a single server, or a server group. The server group may be centralized, or distributed (e.g., the server 110 may be a distributed system). In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing apparatus having one or more components illustrated in FIG. 2 in the present disclosure.

In some embodiments, the server 110 may include a processing device 112. The processing device 112 may process information and/or data relating to target identification to perform one or more functions described in the present disclosure. For example, the processing device 112 may obtain a video from the information provider 130, and determine a time period in which a target object appears in the video using an identification model. In some embodiments, the processing device 112 may include one or more processing devices (e.g., single-core processing device(s) or multi-core processor(s)). Merely by way of example, the processing device 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The storage device 120 may store data and/or instructions related to target identification and/or classification. In some embodiments, the storage device 120 may store data obtained from the information provider 130 and/or the communication platform 140. In some embodiments, the storage device 120 may store data and/or instructions that the server 110 may execute or use to perform exemplary methods described in the present disclosure. In some embodiments, the storage device 120 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 120 may be connected to or communicate with the server 110. The server 110 may access data or instructions stored in the storage device 120 directly or via a network. In some embodiments, the storage device 120 may be a part of the server 110.

The information provider 130 may provide data and/or information related to target identification and/or classification. The data and/or information may include video recordings, images, text files, voice segments, user requests, programs, applications, algorithms, instructions, computer codes, or the like, or a combination thereof. In some embodiments, the information provider 130 may provide the data and/or information to the server 110 and/or the storage device 120 of the target identification system 100 for processing (e.g., identifying a target object from the obtained data and/or information). In some embodiments, the information provider 130 may provide the data and/or information to the communication platform 140 for generating a service response relating to target identification and/or classification.

In some embodiments, the communication platform 140 may be configured to provide online services, such as a target identification service (e.g., a face identification service, a fingerprint identification service, a speech identification service, a text identification service, an image identification service, etc.), a police service (e.g., investigating crimes), a transportation service (e.g., vehicle management service), an unmanned driving service, a medical service, a map-based service (e.g., a route planning service), a live chatting service, a query service, a Q&A service, etc. The communication platform 140 may generate service responses, for example, by inputting the data and/or information received from a user and/or the information provider 130 into a trained identification model.

In some embodiments, the information provider 130 and/or the communication platform 140 may be a device, a platform, or other entity interacting with the target identification system 100. In some embodiments, the information provider 130 may be implemented in a device facilitating data acquisition and/or data storage, such as a camera (not shown in the figure), a car digital video recorder (not shown in the figure), a mobile device 130-1, a tablet computer 130-2, a laptop computer 130-3, and a server 130-4, a storage device (not shown), or the like, or any combination thereof. In some embodiments, the communication platform 140 may also be implemented in a device facilitating data processing, such as a mobile device 140-1, a tablet computer 140-2, a laptop computer 140-3, and a server 140-4, or the like, or any combination thereof. In some embodiments, the mobile devices 130-1 and 140-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, the servers 130-4 and 140-4 may include a database server, a file server, a mail server, a web server, an application server, a computing server, a media server, a communication server, etc.

In some embodiments, the information provider 130 may be a device with data processing technology for preprocessing acquired or stored information (e.g., normalizing stored videos). In some embodiments, the communication platform 140 may be a device for data processing, for example, identifying target objects using a trained identification model received from the server 110. In some embodiments, the communication platform 140 may directly communicate with the information provider 130 via a network 150-3. For example, the communication platform 140 may receive a video from the information provider 130, and generate a video segment including a target object using a trained identification model.

In some embodiments, any two systems of the target identification system 100, the information provider 130, and the communication platform 140 may be integrated into a device or a platform. For example, both the information provider 130 and the communication platform 140 may be implemented in a mobile device of a user. In some embodiments, the target identification system 100, the information provider 130, and the communication platform 140 may be integrated into a device or a platform. For example, the target identification system 100, the information provider 130, and the communication platform 140 may be implemented in a computing apparatus including a server and a user interface.

Networks 150-1 through 150-3 may facilitate exchange of information and/or data. In some embodiments, one or more components in the target identification system 100 (e.g., the server 110 and/or the information provider 130) may send and/or receive information and/or data to/from the information provider 130 and/or the communication platform 140 via the networks 150-1 through 150-3. For example, the server 110 may obtain/acquire an identification model from the information provider 130 via the network 150-1. As another example, the server 110 may transmit/output a trained identification model to the communication platform 140 via the network 150-2. In some embodiments, the networks 150-1 through 150-3 may be any type of wired or wireless networks, or combination thereof. Merely by way of example, the networks 150 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, an ultra wide band (UWB) network, an infrared ray, or the like, or any combination thereof.

Figure 2:
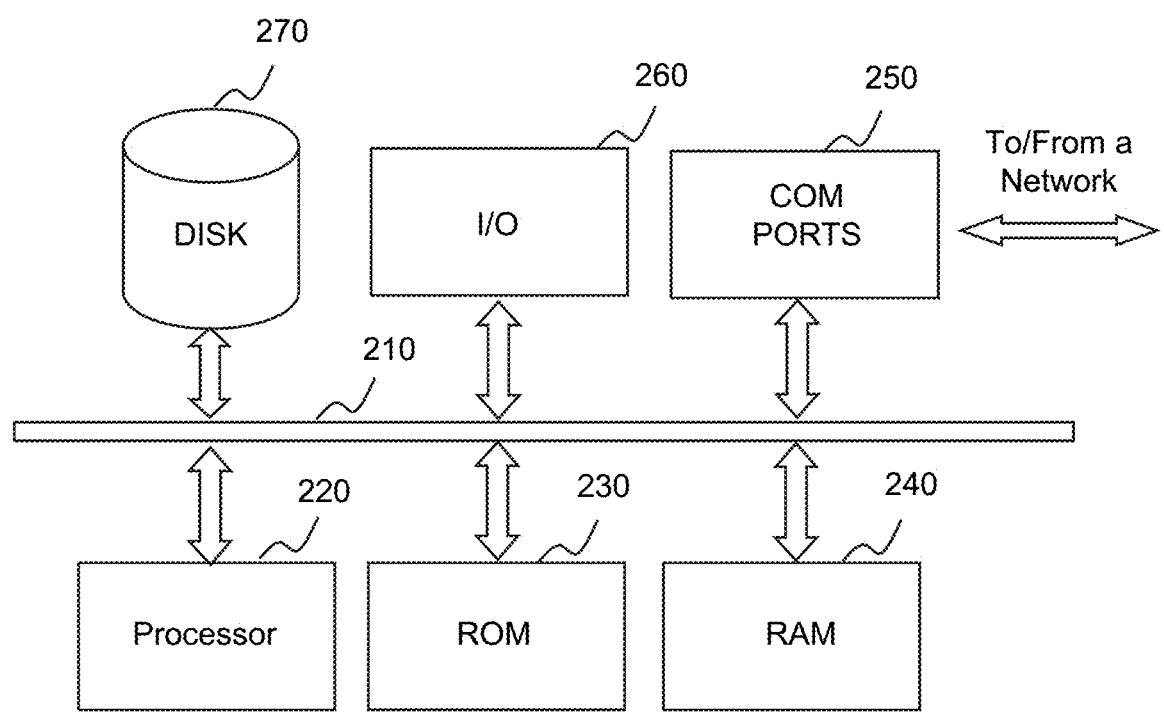
FIG. 2 is a schematic diagram illustrating exemplary components of a computing apparatus according to some embodiments of the present disclosure.

FIG. 2 is a schematic diagram illustrating exemplary components of a computing apparatus according to some embodiments of the present disclosure. The server 110, the storage device 120, the information provider 130, and/or the communication platform 140 may be implemented on the computing apparatus 200 according to some embodiments of the present disclosure. The particular system may use a functional block diagram to explain the hardware platform containing one or more user interfaces. The computer may be a computer with general or specific functions. Both types of the computers may be configured to implement any particular system according to some embodiments of the present disclosure. Computing apparatus 200 may be configured to implement any components that perform one or more functions disclosed in the present disclosure. For example, the computing apparatus 200 may implement any component of the target identification system 100 as described herein. In FIGS. 1-2, only one such computer device is shown purely for convenience purposes. One of ordinary skill in the art would understand at the time of filing of this application that the computer functions relating to the service as described herein may be implemented in a distributed fashion on a number of similar platforms, to distribute the processing load.

The computing apparatus 200, for example, may include COM ports 250 connected to and from a network connected thereto to facilitate data communications. The computing apparatus 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computing apparatus may include the internal communication bus 210, program storage and data storage of different forms including, for example, a disk 270, and a read only memory (ROM) 230, or a random access memory (RAM) 240, for various data files to be processed and/or transmitted by the computing apparatus. The exemplary computing apparatus may also include program instructions stored in the ROM 230, RAM 240, and/or another type of non-transitory storage medium to be executed by the processor 220. The methods and/or processes of the present disclosure may be implemented as the program instructions. The computing apparatus 200 also includes an I/O component 260, supporting input/output between the computer and other components. The computing apparatus 200 may also receive programming and data via network communications.

Merely for illustration, only one processor and/or processor is illustrated in FIG. 2. Multiple CPUs and/or processors are also contemplated; thus operations and/or method steps performed by one CPU and/or processor as described in the present disclosure may also be jointly or separately performed by the multiple CPUs and/or processors. For example, if in the present disclosure the CPU and/or processor of the computing apparatus 200 executes both operation A and operation B, it should be understood that operation A and operation B may also be performed by two different CPUs and/or processors jointly or separately in the computing apparatus 200 (e.g., the first processor executes operation A and the second processor executes operation B, or the first and second processors jointly execute operations A and B).

Figure 3:
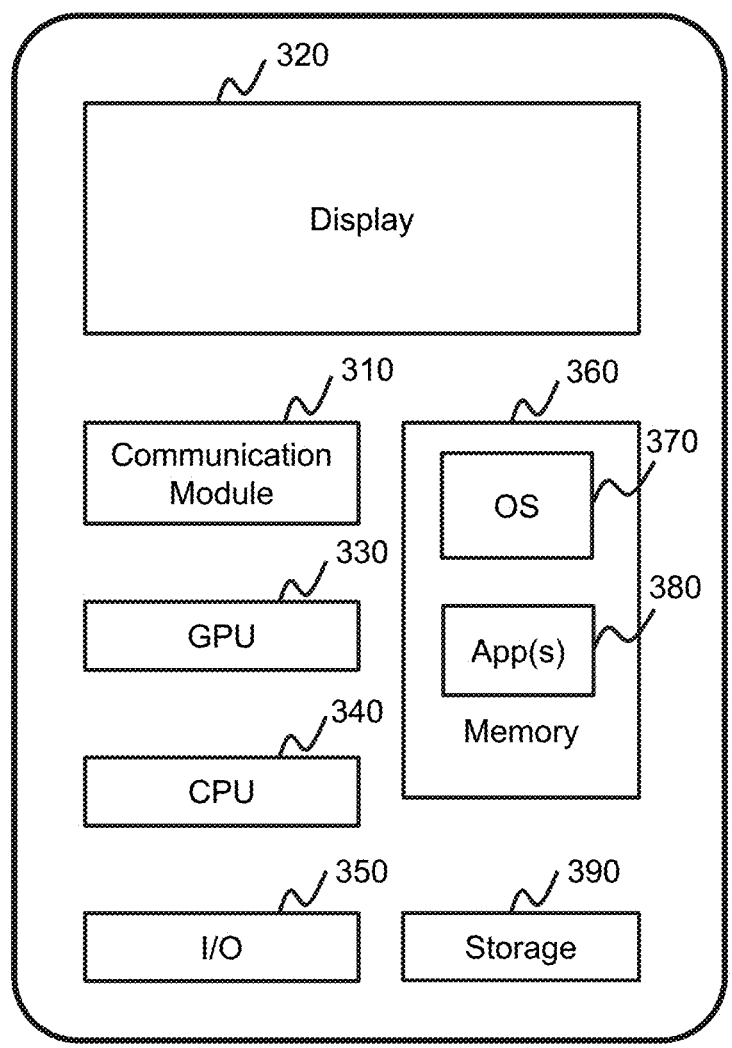
FIG. 3 is a schematic diagram illustrating exemplary hardware and/or software components of an exemplary user terminal according to some embodiments of the present disclosure.

FIG. 3 is a block diagram illustrating exemplary hardware and/or software components of an exemplary requestor terminal according to some embodiments of the present disclosure. The information provider 130 or the communication platform 140 may be implemented on the mobile device 300 according to some embodiments of the present disclosure. As illustrated in FIG. 3, the mobile device 300 may include a communication module 310, a display 320, a graphic processing unit (GPU) 330, a central processing unit (CPU) 340, an I/O 350, a memory 360, and a storage 390. The CPU 340 may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™, Android™ Windows Phone™, etc.) and one or more applications 380 may be loaded into the memory 360 from the storage 390 in order to be executed by the CPU 340. The applications 380 may include a browser or any other suitable mobile apps for receiving and rendering information relating to a service request or other information from the target identification system on the mobile device 300. User interactions with the information stream may be achieved via the I/O devices 350 and provided to the processing device 112 and/or other components of the target identification system 100 via the network 150.

In order to implement various modules, units and their functions described above, a computer hardware platform may be used as hardware platforms of one or more elements (e.g., a component of the server 110 described in FIG. 1). Since these hardware elements, operating systems, and program languages are common, it may be assumed that persons skilled in the art may be familiar with these techniques and they may be able to provide information required in the data classification according to the techniques described in the present disclosure. A computer with a user interface may be used as a personal computer (PC), or other types of workstations or terminal devices. After being properly programmed, a computer with a user interface may be used as a server. It may be considered that those skilled in the art may also be familiar with such structures, programs, or general operations of this type of computer device. Thus, additional explanations are not described for the figures.

Figure 4:
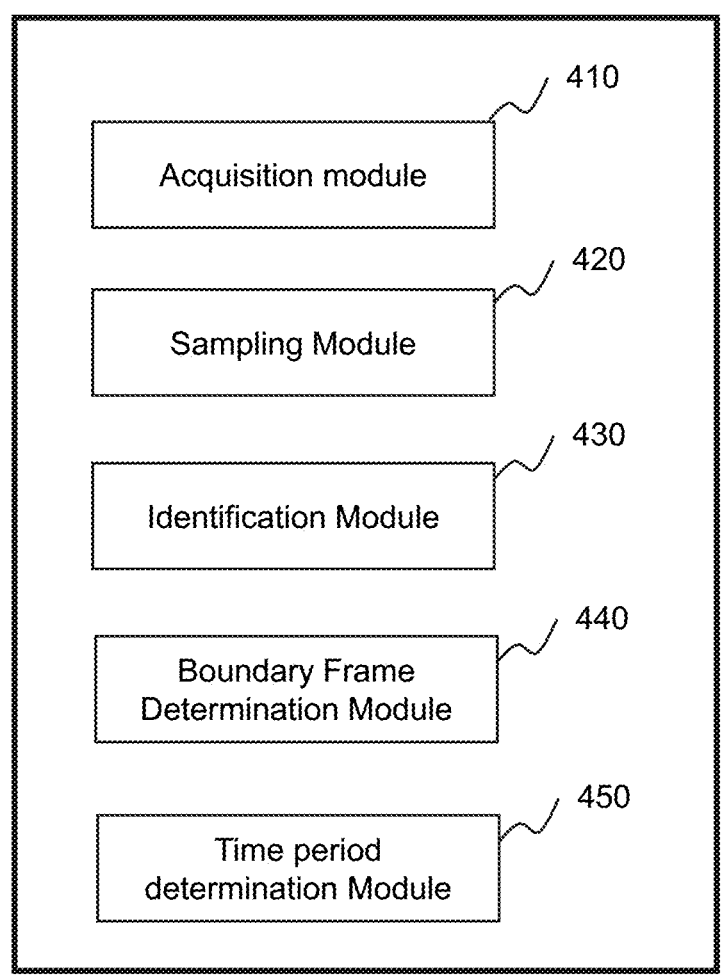
FIG. 4 is a block diagram illustrating an exemplary processing device according to some embodiments of the present disclosure.

FIG. 4 is a block diagram illustrating an exemplary processing device according to some embodiments of the present disclosure. The processing device 112 may include an acquisition module 410, a sampling module 420, an identification module 430, a boundary frame determination module 440, and a time period determination module 450. The modules may be hardware circuits of at least part of the processing device 112. The modules may also be implemented as an application or set of instructions read and executed by the processing device 112. Further, the modules may be any combination of the hardware circuits and the application/instructions. For example, the modules may be the part of the processing device 112 when the processing device 112 is executing the application/set of instructions.

The acquisition module 410 may obtain data from one or more components in the target identification system 100. In some embodiments, the obtained data may include a video. The video may be an electronic medium (e.g., a data file, a bit stream, a series of signals) for the recording, copying, playback, broadcasting, and display of moving visual media, such as a TV program, an animation, a movie, a surveillance or monitoring video, a video shared through a social platform, an advertisement, a live show, a video call, a video conference, or the like, or a combination thereof. The video may include a plurality of frames of video data, which may also be referred to as video frames. A frame may be one of a plurality of still images that compose a complete video. By sequentially displaying the plurality of frames (e.g., images) of a video, a video player installed on a terminal 300 may present the video to a user via a terminal device (e.g., a mobile phone, a laptop, or a wearable device). A frame of the video or the video data may correspond to a time point.

In some embodiments, the acquisition module 410 may obtain the video from the information provider 130 via the networks 150-1. In some embodiments, the acquisition module 410 may obtain the video from a storage device (e.g., the storage device 120). The acquisition module 410 may transmit the obtained video data to other modules in the processing device 112 (e.g., the sampling module 420 or the identification module 430) for further processing.

The sampling module 420 may sample one or more frames from a plurality of frames of a video. In some embodiments, the video may have a certain frame rate, for example, 25 frames per second (FPS), 50 FPS, 60 FPS, etc. In some embodiments, the sampling module 420 may sample one or more frames from the video using a frame-skipping sampling technique (e.g., the sampling module 420 may sample one or more frames at a preset interval). Each pair of consecutive sampled frames may be spaced apart by one or more frames of the video data. Merely by ways of example, the sampling module 420 may sample a frame per second from the video data whose frame rate is 25 FPS such that one frame in every 25 frames of the video data is sampled and each pair of consecutive sampled frames may be spaced apart by 24 frames of the video data. The preset time points or the preset interval may be determined by a user (e.g., a technician, an analyst), according to default settings of the target identification system 100.

The identification module 430 may identify a target object in a frame. The target object may include, for example, a person or a part of a person, a vehicle or a part of a vehicle, an animal or a part of an animal, a room or a part of a room, etc. In some embodiments, the target object may vary in different scenarios, for example, face identification, crimes investigation, traffic management, autonomous driving, self-service retail, navigation, live chatting, query service (e.g., for identifying a target building in a video recorded in a digital video recorder installed in a car), automated customer service, etc. In some embodiments, identification module 430 may identify a target object in a frame using an identification model. As used herein, that a target object is identified in a frame means that the frame includes the target object, or the target object appears in the frame. As used herein, that a target object is not identified in a frame means that the frame does not include the target object, or the target object does not appear in the frame. The identification model may be or include a machine learning model. Exemplary machine learning models may include a Convolutional Neural Network (CNN) model, a Long Short-Term Memory (LSTM) model, a Recurrent Neural Network (RNN) model, a Generative Adversative Nets (GAN) model, or the like, or any combination thereof. Merely by way of example, the identification model may be constructed based on a CNN model.

In some embodiments, the identification module 430 may obtain a trained identification model from one or more components of the target identification system 100 (e.g., the information provider). In some embodiments, the identification module 430 may train an identification model using training data related to the target object. In some embodiments, the training data may be images including the target object. During a training process of the identification model, one or more parameters (e.g., weights, a regularization item, a mini-batch size, etc.) of the identification model may be updated.

The identification module 430 may identify the target object by applying a trained identification model to a sampled frame. For example, the identification module 430 may apply an identification model trained with images including the target object to a sampled frame, and obtain a probability (e.g., 80%) that the target object appears in the sampled frame.

Among the sampled frames, e.g., the frames sampled according to the frame-skipping sampling technique, a frame in which the target object is identified may be designated as the reference frame. In some embodiments, the frame-skipping sampling and the target object identification in sampled frames may be performed in series. For instance, the frame-skipping sampling and the target object identification may alternate. In some embodiments, the frame-skipping sampling and the target object identification in sampled frames may be performed in parallel. For instance, the target object identification may be performed at the same time as the frame-skipping sampling but with a lag (considering that the target object identification is performed on one or more frames sampled in the frame-skipping sampling). When one or more frames are sampled from the plurality of frames of the video data, the identification model trained with respect to the target object may be applied to the sampled one or more frames to determine if the target object appears in any one of the one or more sampled frames. If the target object is identified in a sampled frame, the sampled frame may be designated as the reference frame. The frame-skipping sampling may terminate, and forward scanning and/or backward scanning with respect to the reference frame may commence.

The boundary frame determination module 440 may determine a start frame and an end frame including the target object associated with the time period in which the target object appears in the video. The boundary frame determination module 440 may determine the start frame and the end frame by scanning frames preceding and following the sampled frame in a first direction and a second direction, respectively.

In some embodiments, if a target object is identified in a sampled frame (a reference frame), the boundary frame determination module 440 may initiate a scanning process for scanning each frame preceding and following the reference frame in two directions in time including a first direction in time and a second direction in time, respectively. The first direction in time may be opposite to a time direction of the video. The second direction in time may be the same as the time direction of the video. As used herein, the time direction of the video may refer to a direction in which the plurality of frames in the video are displayed sequentially. Frames preceding the reference frame (also referred to as "preceding frames of the reference frame") may include at least a portion of frames between the reference frame and an initial frame corresponding to a beginning end of the video. Frames following the reference frame (also referred to as "subsequent frames of the reference frame") may include at least a portion of frames between the sampled frame and a final frame corresponding to a closing end of the video. The operation for scanning the preceding frames of the reference frame may be referred to as a forward scanning operation. The operation for scanning the subsequent frames of the reference frame may be referred to as a backward scanning operation.

In some embodiments, the boundary frame determination module 440 may scan each frame of a portion of preceding frames of the reference frame sequentially along the first direction in time. During the scanning process, the identification module 430 may determine whether the target object appears in each frame preceding the reference frame sequentially in the first direction in time. If it is determined that the target object does not appear in one or more consecutive frames, the boundary frame determination module 440 may designate a subsequent frame immediately following the one or more consecutive frames as a start frame including the target object. Similarly, the boundary frame determination module 440 may scan each frame after the reference frame sequentially in the second direction. During the scanning process, the identification module 430 may determine whether the target object appears in each frame following the reference frame sequentially in the second direction in time. If it is determined that the target object does not appear in one or more consecutive frames, the boundary frame determination module 440 may designate a preceding frame immediately preceding the one or more consecutive frames as an end frame including the target object.

The time period determination module 450 may determine a time period in which the target object appears in the video. In some embodiments, time period determination module 450 may obtain the start frame and the end frame from the boundary frame determination module 440, and determine the time period in which the target object appears in the video based on the start frame and the end frame.

In some embodiments, the start frame may correspond to a start time point, and the end frame may correspond to an end time point. The time period determination module 450 may determine the time period in which the target object appears in the video by determining a time period between the start time point and the end time point.

It should be noted that the above description of the processing device 112 is merely provided for the purposes of illustration, and not intended to limit the scope of the present disclosure. For persons having ordinary skills in the art, multiple variations and modifications may be made under the teachings of the present disclosure. For example, the processing device 112 may further include a storage module facilitating data storage. However, those variations and modifications do not depart from the scope of the present disclosure.

Figure 5A:
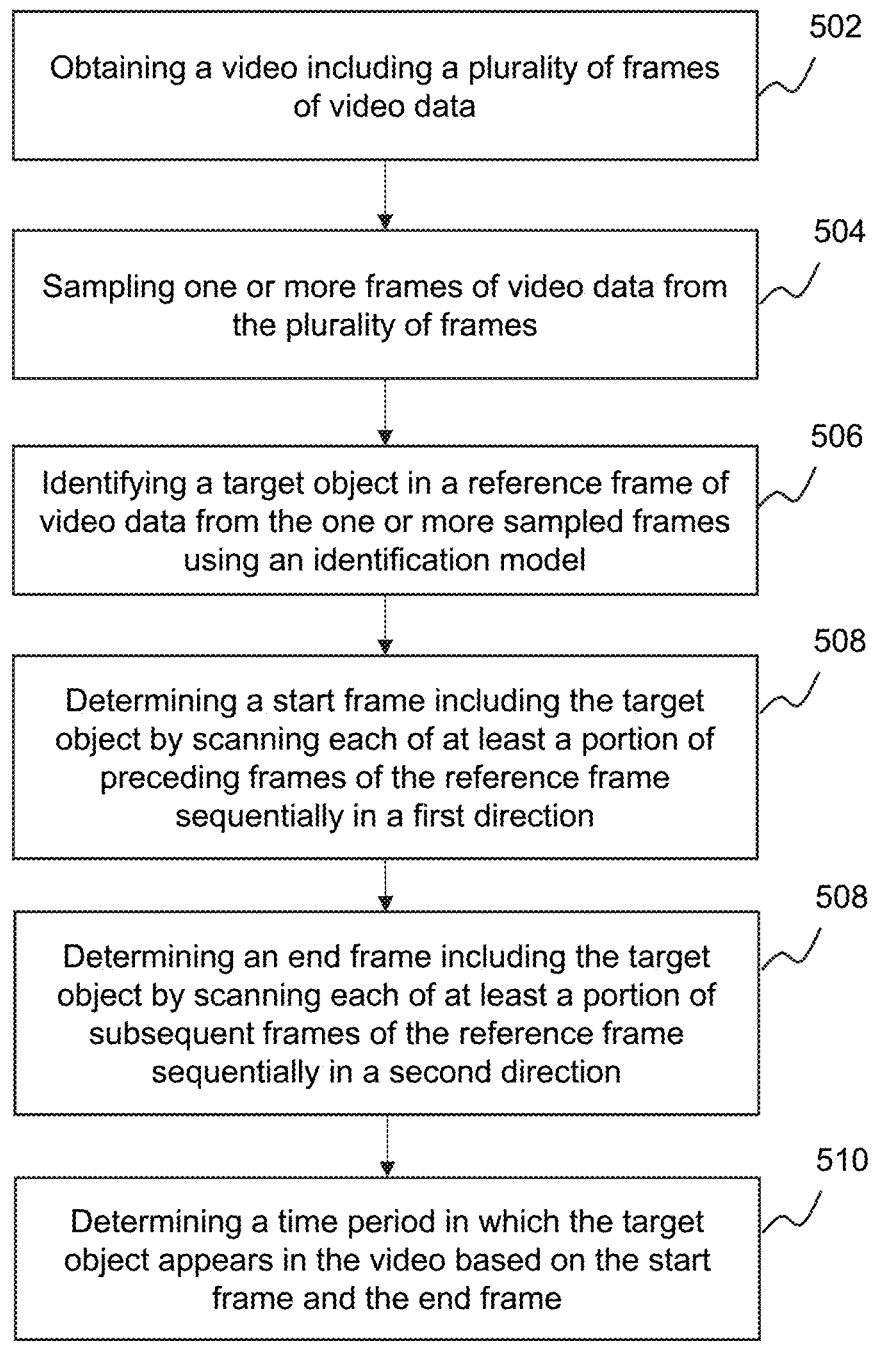
FIG. 5A is a flowchart illustrating an exemplary process for determining a time period in which a target object appears in a video according to some embodiments of the present disclosure.

FIG. 5A is a flowchart illustrating an exemplary process for determining a time period in which a target object appears in a video according to some embodiments of the present disclosure. In some embodiments, the process 500 shown in FIG. 5A may be implemented in the target identification system 100 illustrated in FIG. 1. For example, at least a part of the process 500 may be stored in a storage device (e.g., the DISK 270 of the computing apparatus 200) as a form of instructions, and invoked and/or executed by the server 110 (e.g., the processor 220 of the computing apparatus 200, or one or more modules illustrated in FIG. 4). In some embodiments, a part of the process 500 may be implemented on a terminal device. The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5A and described below is not intended to be limiting.

In 502, a video including a plurality of frames of video data may be obtained. In some embodiments, the video may be obtained by the acquisition module 410. For example, the acquisition module 410 may obtain a video from the information provider 130 over the network 150-1. As another example, the acquisition module 410 may obtain a video from a storage device (e.g., the storage device 120).

In some embodiments, the video may be an electronic medium (e.g., a data file, a bit stream, a series of signal) for the recording, copying, playback, broadcasting, and display of moving visual media, such as a TV program, an animation, a movie, a surveillance or monitoring video, a video shared through a social platform, an advertisement, a live show, a video call, a video conference, or the like, or a combination thereof. The video may start from a beginning end, and stop at a closing end. The video may include a plurality of frames of video data, which may also be referred to as video frames. The beginning end of the video may correspond to an initial frame, and the closing end of the video may correspond to a final frame. A frame may be one of a plurality of still images that compose a complete video. By sequentially displaying the plurality of frames (e.g., images) of a video, a video player installed on a terminal 300 may present the video to a user via a terminal device (e.g., a mobile phone, a laptop, or a wearable device). The video may have a certain frame rate, such as 25 frames per second (fps), 60 fps, etc.

In 504, one or more frames of video data may be sampled from the plurality of frames. The one or more frames may be sampled by, for example, the sampling module 420.

In some embodiments, the sampling module 420 may sample the one or more frames from the video using a frame-skipping sampling technique to save the time spent on sampling frames, which may further save time in subsequent analysis on identifying frames or the time period in which a target object appears in the video. In some embodiments, the sampling module 420 may sample the one or more frames at a preset time interval. For example, the sampling module 420 may sample, from the plurality of frames, one frame per second. In some embodiments, the sampling module 420 may sample the one or more frames at a preset interval of at least one frame. For example, the sampling module 420 may sample the one or more frames at an interval of 30 frames. Each pair of consecutive sampled frames may be spaced apart by at least one frame of the video data. In some embodiments, the number of the at least one frame of video data between each pair of consecutive sampled frames may be determined by a user (e.g., a technician), according to default settings of the target identification system 100.

Since the video has a certain frame rate, each frame of the one or more sampled frames may correspond to a time point relative to a beginning end of the video (i.e., an initial frame of the video). For example, if the sampling module 420 samples, at an interval of 30 frames, five frames from the beginning end of a video of 60 fps, the sampled frames may correspond to five time points at 0.5 seconds, 1 second, 1.5 seconds, 2 seconds, and 2.5 seconds.

In 506, a target object in a reference frame of video data may be identified from the one or more sampled frames using an identification model. As used herein, the reference frame may refer to a frame of the one or more sampled frames in which the target object appears. The target object may be identified by, for example, the identification module 430. The target object may include, for example, a person or a part of a person, a vehicle or a part of a vehicle, an animal or a part of an animal, a room, a household appliance, etc. In some embodiments, the target object may vary in different scenarios, for example, face identification, crimes investigation, traffic management, autonomous driving, self-service retail, navigation, live chatting, query service, automated customer service, etc. In some embodiments, the identification model used to identify a target object may be or include a machine learning model. Exemplary machine learning models may include a Convolutional Neural Network (CNN) model, a Long Short-Term Memory (LSTM) model, a Recurrent Neural Network (RNN) model, a Generative Adversative Nets (GAN) model, or the like, or any combination thereof. In some embodiments, the identification model may be a CNN model. An exemplary structure of the identification model may be found elsewhere in the present disclosure. See, for example, FIG. 7 and the descriptions thereof.

In some embodiments, the identification model may be a trained model. Merely for illustration purposes, the identification model used to identify a target object may be trained with training data related to the target object. In some embodiments, the training data may be images including the target object. During a training process of the identification model, one or more parameters (e.g., weights, a regularization item, a mini-batch size, etc.) of the identification model may be updated. The training process (e.g., an iterative process) may terminate when a preset condition is satisfied. For example, the training process may terminate when a convergence of a loss function of the identification model is reached. As another example, the training process may terminate when a certain number or count (e.g., 100, 300, etc.) of iterations are performed.

The target object in the reference frame may be identified by applying a trained identification model to the one or more sampled frames. Merely by way of example, the identification module 430 may apply a trained identification model to a sampled frame, and obtain a probability (e.g., 80%) that that the target object appears in the sampled frame.

In 508, a start frame including the target object may be determined by scanning each of at least a portion of preceding frames of the reference frame sequentially in a first direction in time. In some embodiments, the start frame including the target object may be determined by the boundary frame determination module 440.

A start frame may correspond to a start time point of a time period in which the target object appears in at least a portion of a video. An end frame may correspond to an end time point of a time period in which the target object appears in at least a portion of a video. In some embodiments, if a target object is identified in a reference frame, a scanning process for scanning each of at least a portion of preceding frames of the reference frame sequentially in a first direction may be initiated so as to improve the accuracy of the start frame and the end frame including the target object. As used herein, a preceding frame of the reference frame may refer to a frame corresponding to a time point earlier than a reference time point corresponding to the reference frame. In some embodiments, preceding frames of the reference frame may include frames between the reference frame and an initial frame corresponding to the beginning end of the video. The first direction in time may refer to a direction from a later time point of the video to an earlier time point of the video. For example, the first direction in time may be from a time point of 00:03:03 to a time point of 00:01:15 in a video beginning from an initial time point 00:00:00.

In some embodiments, the boundary frame determination module 440 may scan each of at least a portion of the preceding frames of the reference frame sequentially along the first direction in time. During the forward scanning, the identification module 430 may determine whether a frame of the at least a portion of the preceding frames of the reference frame includes the target object. If it is determined that the target object does not appear in one or more consecutive frames, the boundary frame determination module 440 may designate a frame immediately subsequent the one or more consecutive frames as the start frame including the target object.

Taking a video including S frames as an example, the identification module 430 may identify a target object in a reference frame n (S>n). Preceding frames of the reference frame n may include frames between the reference frame n and an initial frame corresponding to the beginning end of the video frame 1, such as frames n−1, n−2, n−3, . . . , 1. The boundary frame determination module 440 may determine the start frame including the target object by performing a forward scanning on each frame of at least a portion of the preceding frames of the reference frame sequentially along the first direction in time. The identification module 430 may determine whether the frame n−1, the frame n−2, the frame n−3, . . . , and the frame 1 or a portion of the frame n−1, the frame n−2, the frame n−3, . . . , and the frame 1 includes a target object sequentially. If the identification module 430 determines that one or more consecutive frames, for example, a frame n−a−1, a frame n−a−2, . . . , and a frame n−a−c (a and c may be natural numbers, and a+c≤n−1) does not include the target object, the boundary frame determination module 440 may terminate the redundant forward scanning process, and designate a frame immediately subsequent to the frame n−a−1 (i.e., a frame n−a) as the start frame including the target object. In some embodiments, the forward scanning may include a redundant forward scanning. See, e.g., FIG. 6 and the description thereof.

In 510, an end frame including the target object may be determined by scanning each of at least a portion of subsequent frames of the reference frame sequentially in a second direction in time. In some embodiments, the end frame including the target object may be determined by the boundary frame determination module 440. As used herein, a subsequent frame of the reference frame may refer to a frame corresponding to a time point later than a reference time point corresponding to the reference frame. In some embodiments, preceding frames of the reference frame may include frames between the reference frame and a final frame corresponding to the closing end of the video. The second direction in time may refer to a direction from an earlier time point of the video to a later time point of the video. For example, the second direction in time may be from a time point of 00:03:03 to a time point of 00:10:00 in a video beginning from an initial time point 00:00:00. In some embodiments, the operations in 510 for determining the end frame may be the same as or similar to the operations in 508 for determining the start frame.

Taking the video mentioned above as an example, the identification module 430 may identify the target object in the reference frame n (S>n). Subsequent frames of the reference frame n may include frames between the reference frame n and a final frame S corresponding to the closing end of the video, such as frames n+1, n+2, n+3, . . . , S. The boundary frame determination module 440 may determine the end frame including the target object by performing a backward scanning on each frame of at least a portion of the subsequent frames of the reference frame sequentially along the second direction. The identification module 430 may determine whether the frame n+1, the frame n+2, the frame n+3, . . . , and the frame S or a portion of the frame n+1, the frame n+2, the frame n+3, . . . , and the frame S includes a target object sequentially. If the identification module 430 determines that one or more consecutive frames, for example, a frame n+b+1, a frame n+b+2, . . . , and a frame n+b+d (b and d may be natural numbers, and b+d≤S−n) does not include the target object, the boundary frame determination module 440 may terminate the redundant backward scanning process, and designate a frame immediately preceding the frame n+b+1 (i.e., a frame n+b) as an end frame including the target object. In some embodiments, the backward scanning may include a redundant backward scanning. See, e.g., FIG. 6 and the description thereof.

In 512, a time period in which the target object appears in the video may be determined based on the start frame and the end frame. In some embodiments, the time period may be determined by the time period determination module 450. In some embodiments, the start frame may correspond to a start time point, and the end frame may correspond to an end time point. A time period between the start time point and the end time point may be determined as the time period in which the target object appears in the video. For example, the start frame in the video may correspond to a start time point at 00:00:30, and the end frame in the video may correspond to an end time point at 00:01:03, then the time period in which the target object appears in the video may be 33 seconds.

It should be noted that the above description is merely provided for the purposes of illustration, and not intended to limit the scope of the present disclosure. For persons having ordinary skills in the art, multiple variations and modifications may be made under the teachings of the present disclosure. For example, the operations in 504 and 506 may be executed at a same time. Merely for illustration purposes, during the sampling process, each sampled frame may be identified using the identification model (e.g., an identification model trained with respect to the target object) after the frame is sampled and transmitted into a frame keeper for storage. As another example, the identification model may be an identification algorithm or a model other than a machine learning model. As a further example, the video may include multiple portions spaced apart by an interval in which the target object appears; the process 500 may be repeated to identify one or more of such portions of the video. However, these variations and modifications fall in the scope of the present disclosure.

Figure 5B:
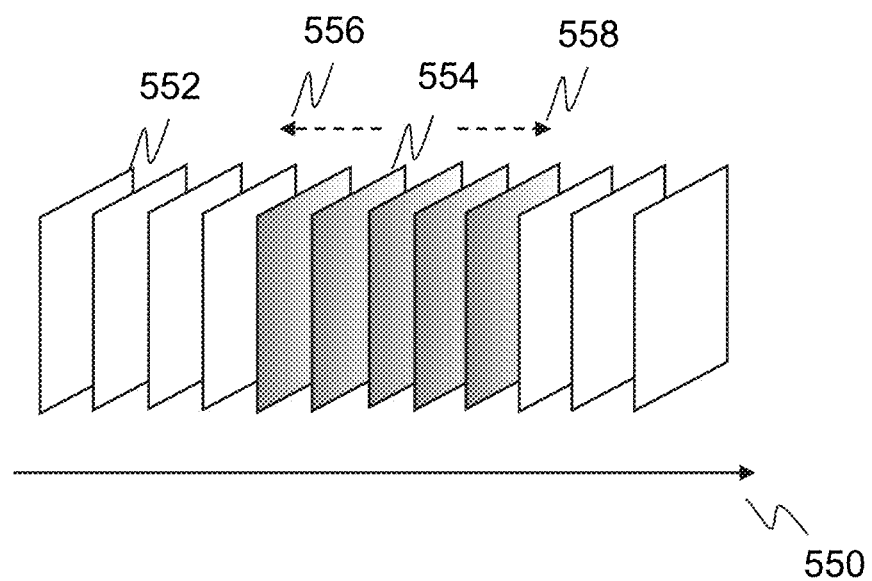
FIG. 5B is a schematic diagram illustrating the determination of a time period in which a target object appears in a video according to some embodiments.

FIG. 5B is a schematic diagram illustrating the determination of a time period in which a target object appears in a video according to some embodiments. FIG. 5B may be described in connection with FIG. 5A.

As illustrated in FIG. 5B, a video may include a plurality of frames. When the video is displayed on a terminal device, the plurality of frames (e.g., in the form of still images) may be displayed sequentially in a time direction 550. The sampling module 420 may sample one or more frames from the plurality of frames according to a frame-skipping sampling technique. The identification module 430 may identify a target object in a reference frame from the one or more sampled frames. Merely for illustration purposes, after the sampling module 420 samples a first frame 552, the identification module 430 may be directed to determine whether a target object appears in the first frame 552. If the identification module 430 determines that the target object does not appear in the first frame 552, the sampling module 420 may sample a second frame 554. In some embodiments, the first frame 552 and the second frame 554 may be sampled according to a frame-skipping sampling technique and therefore spaced apart by at least one frame of the video data. The identification module 430 may be directed to determine whether the target object appears in the second frame 554. If the identification module 430 determines that a target object appears in the second frame 554, the boundary frame determination module 440 may perform a forward scanning by scanning each of at least a portion of preceding frames of the second frame 554 (also referred to as "reference frame") sequentially in a first direction in time 556 and a backward scanning by scanning each of at least a portion of subsequent frames of the second frame 554 sequentially in a second direction in time 558. In some embodiments, preceding frames of the second frame 554 may include frames between an initial frame corresponding to a beginning end of the video (not shown in the figure) and the second frame 554. In some embodiments, only a portion of the frames between the initial frame corresponding to a beginning end of the video (not shown in the figure) and the second frame 554 are scanned in the forward scanning. In some embodiments, subsequent frames of the second frame 554 may include frames between the second frame 554 and a final frame corresponding to a closing end of the video (not shown in the figure). In some embodiments, only a portion of the frames between the second frame 554 and a final frame corresponding to a closing end of the video are scanned in the backward scanning.

During the forward scanning, the identification module 430 may determine whether each frame of the at least a portion of preceding frames of the second frame 554 includes the target object sequentially in the first direction in time 556. If it is determined that the target object does not appear in one or more consecutive frames of the at least a portion of preceding frames of the second frame 554, the boundary frame determination module 440 may designate a frame immediately subsequent the one or more consecutive frames as a start frame. Similarly, the identification module 430 may determine whether the target object appears in each frame of the at least a portion of subsequent frames of the second frame 554 sequentially in the second direction 558. If it is determined that the target object does not appear in one or more consecutive frames of the at least a portion of subsequent frames of the second frame 554, the boundary frame determination module 440 may designate a frame immediately preceding the one or more consecutive frames as an end frame.

Figure 6:
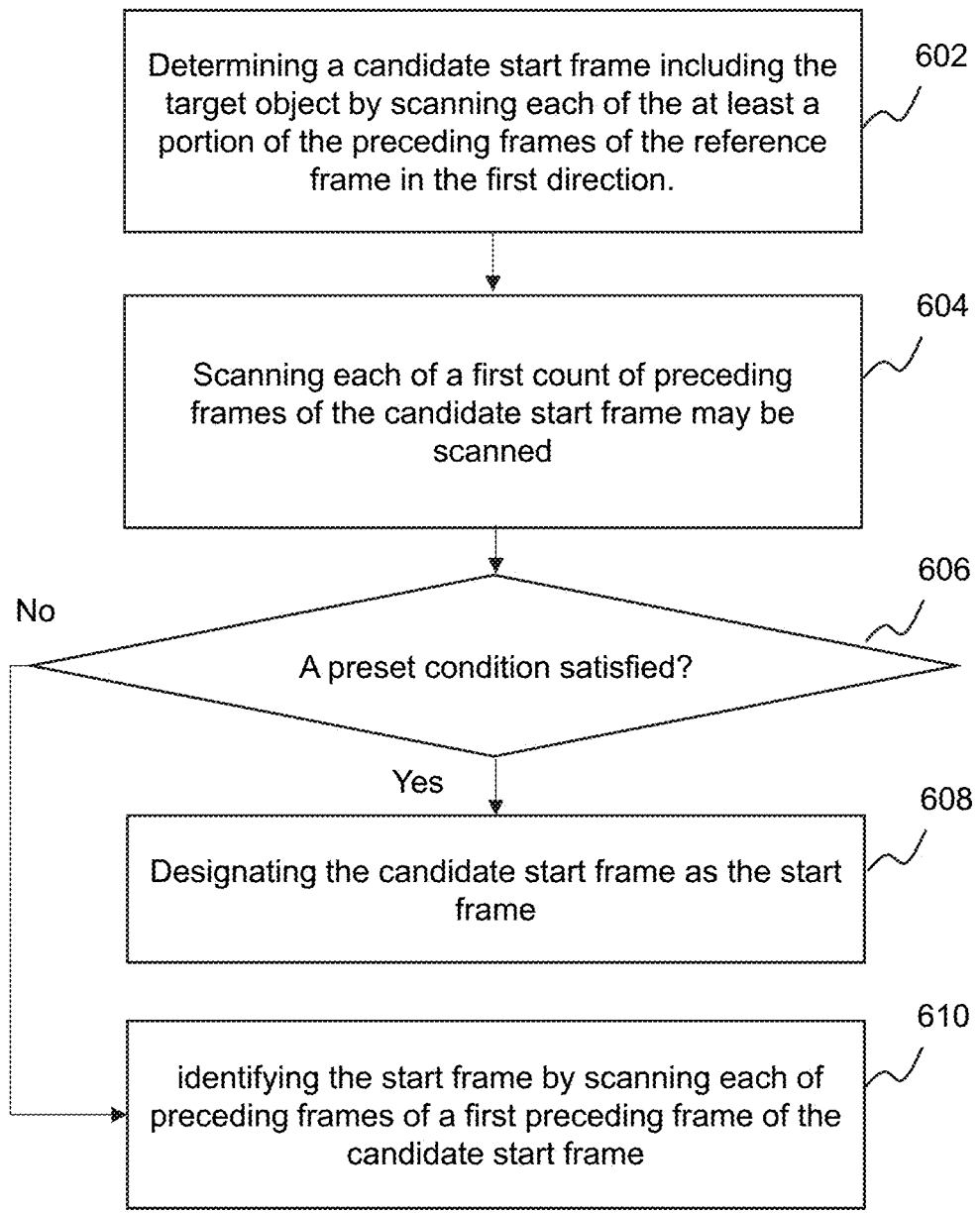
FIG. 6 is a flowchart illustrating an exemplary process for determining a start frame including the target object according to some embodiments of the present disclosure.

FIG. 6 is a flowchart illustrating an exemplary process for determining a start frame including the target object according to some embodiments of the present disclosure. In some embodiments, operation 508 of process 500 may be performed according to process 600 illustrated in FIG. 6. In some embodiments, the process 600 shown in FIG. 6 may be implemented in the target identification system 100 illustrated in FIG. 1. For example, at least a part of the process 600 may be stored in a storage medium (e.g., the DISK 270 of the computing apparatus 200) as a form of instructions, and invoked and/or executed by the server 110 (e.g., the processor 220 of the computing apparatus 200, or one or more modules illustrated in FIG. 4). In some embodiments, a part of the process 600 may be implemented on a terminal device. The operations of the illustrated process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In 602, a candidate start frame including the target object may be determined by way of forward scanning by scanning each of the at least a portion of the preceding frames of the reference frame sequentially along the first direction in time. In some embodiments, the candidate start frame including the target object may be determined by the boundary frame determination module 440.

In some embodiments, the boundary frame determination module 440 may scan each of at least a portion of the preceding frames of the reference frame sequentially along the first direction in time. During the forward scanning process, the identification module 430 may determine whether each frame of at least a portion of the preceding frames of the reference frame includes the target object sequentially in the first direction in time. If a frame of the at least a portion of preceding frames of the reference frame does not include the target object, the boundary frame determination module 440 may designate a frame immediately subsequent to the frame as a candidate start frame (i.e., the target object is not identified in the frame immediately preceding the candidate start frame).

In 604, a forward redundant scanning may be performed in which each of a first count of preceding frames of the candidate start frame is scanned suquentially along the first direction in time. In some embodiments, the frames may be scanned by the identification module 430.

As used herein, a preceding frame of the candidate start frame may refer to a frame corresponding to a time point earlier than a time point corresponding to the candidate start frame. The first count may be an integer (e.g., 5, 8, 10, etc.). In some embodiments, the first count may be set by a user, according to a default setting of the target identification system 100, etc. In some embodiments, the first count of preceding frames of the candidate start frame may be determined based on a threshold count of the preceding frames of the candidate start frame to be scanned to identify the target object. For example, the identification module 430 may scan preceding frames of the candidate start frame of a threshold count (e.g., 5) to determine whether the target object appears in any one of the frames. In some embodiments, the first count of preceding frames of the candidate start frame may be determined based on a threshold time period within which corresponding preceding frames of the candidate start frame are to be scanned to identify the target object. For example, the identification module 430 may scan preceding frames of the candidate start frame in a threshold time period (e.g., frames in a time period from 00:00:30 to 00:01:00) to determine whether the target object appears in any one of the frames. In some embodiments, the first count of the preceding frames of the candidate start frame may be determined until the target object is identified in one of the preceding frames of the candidate start frame. In some embodiments, the operations of the forward redundant scanning performed in 604 may also be referred to as a redundancy checking. The redundancy checking may be performed to avoid or reduce errors existing in the identification of a target object in preceding frames of the reference frame.

In 606, a determination may be made as to whether a preset condition is satisfied. If the preset condition is satisfied, the process 600 may proceed to 608. If the preset condition is not satisfied, the process 600 may proceed to 610. In some embodiments, the preset condition may be that the target object appears in any one of the first count of the preceding frames of the candidate start frame. In some embodiments, the preset condition may be that one or more (e.g., 2, 3, etc.) consecutive preceding frames of the candidate start frame are identified in which the target object does not appear.

In 608, the candidate start frame may be designated as the start frame. If all of the first count of the preceding frames of the candidate start frame do not include the target object, the boundary frame determination module 440 may designate the candidate start frame as the start frame.

In 610, the start frame may be determined by identifying the start frame by scanning, as part of the redundant forward scanning, each of preceding frames of a first preceding frame of the candidate start frame. The first preceding frame of the candidate start frame may correspond to an earliest time point among the at least one of the first count of the preceding frames of the candidate start frame that includes the target object. In some embodiments, the first preceding frame of the candidate start frame may be identified in 604. In some embodiments, the scanning process may terminate until the start frame is determined (e.g., by performing one or more redundancy checking operations) in which the target object appears. In some embodiments, the scanning process may terminate until the scanning reaches the initial frame of the video.

In some embodiments, the backward scanning in which the end frame including the target object is determined may also include a redundant backward scanning, which may be the same as or similar to the forward redundant scanning including the operations in 602 through 610 of the process 600. In some embodiments, a process for determining the end frame may include one or more of the following operations. Merely for illustration purposes, a candidate end frame including the target object may be determined by way of forward scanning by scanning each of the at least a portion of the subsequent frames of the reference frame sequentially along the second direction in time, wherein the target object is not identified in the frame immediately subsequent the candidate end frame. Each of a second count of subsequent frames of the candidate end frame may be scanned. The second count of the subsequent frames of the candidate end frame is determined based on at least one criterion. In some embodiments, the at least one criterion may include a threshold count of the subsequent frames of the candidate end frame to be scanned. In some embodiments, the at least one criterion may include a threshold time period within which corresponding subsequent frames of the candidate end frame are to be scanned to identify the target object. In some embodiments, the at least one criterion may include until the target object is identified in one of the subsequent frames of the candidate end frame. A determination may be made as to whether a preset condition (e.g., the target object appears in any one of the second count of the subsequent frames of the candidate end frame) is satisfied. If the preset condition is satisfied, the candidate end frame may be designated as the end frame. If the preset condition is not satisfied, the end frame may be determined by scanning, as part of the redundant backward scanning, each of subsequent frames of a second subsequent frame of the candidate end frame. The second subsequent frame of the candidate end frame may correspond to a latest time point among the at least one of the second count of the subsequent frames of the candidate end frame that includes the target object. In some embodiments, the scanning process may terminate until the end frame is determined (e.g., by performing one or more redundancy checking operations) in which the target object appears. In some embodiments, the scanning process may terminate until the scanning reaches the final frame of the video.

Figure 7:
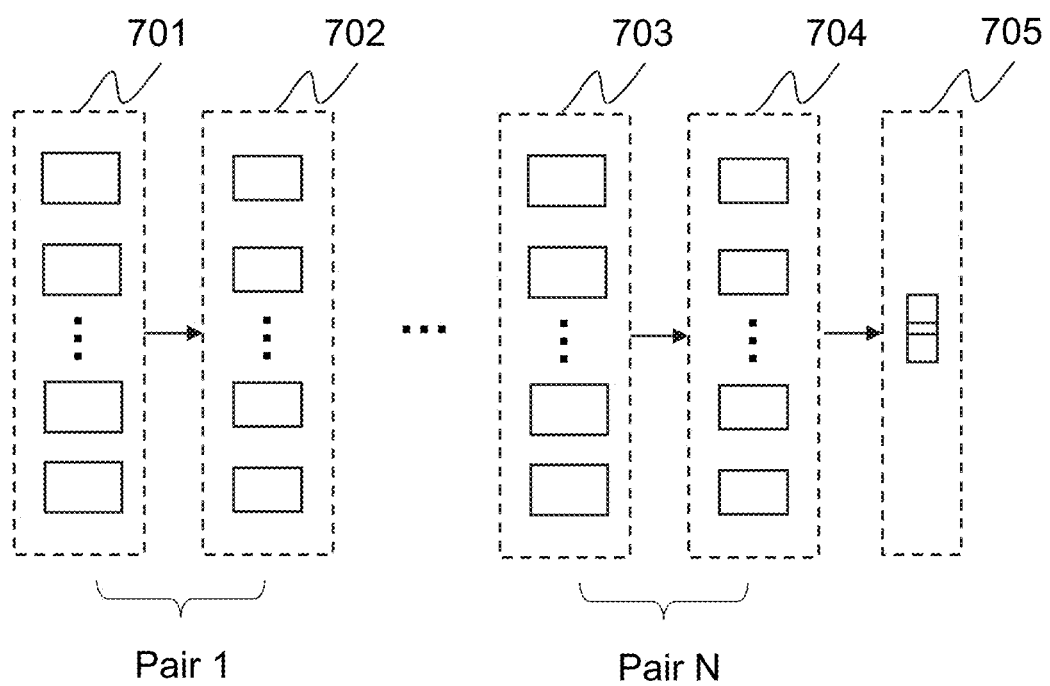
FIG. 7 is a schematic diagram illustrating an exemplary structure of an identification model according to some embodiments of the present disclosure.

FIG. 7 is a schematic diagram illustrating an exemplary structure of a convolutional neural network 700 according to some embodiments of the present disclosure. In some embodiments, an identification model for identifying a target object in a frame of video data may take the form of the convolutional neural network 700. As illustrated in FIG. 7, the convolutional neural network 700 may include multiple pairs of convolutional layers and pooling layers (e.g., convolutional layers 701 and 703, pooling layers 702 and 704), and a fully connected layer 705. The fully connected layer 705 may be coupled to the multiple pairs of convolutional layers by connecting the pooling layer 704 in the last pair. A convolutional layer (e.g., the convolutional layer 701) may extract features (e.g., in the form of feature maps) from an image. Specifically, the convolution layer may convolve the image with a set of filters, and produce a plurality of feature maps. A pooling layer (e.g., the pooling layer 702) placed after a convolutional layer may reduce the dimensionality of a feature map output by the convolutional layer so as to improve computational efficiency and enhance the performance of the convolutional neural network 700. The fully connected layer 705 may be typically a normalization layer for converting an output vector into a predetermined range. The convolutional neural network 700 may receive an image in the convolutional layers 701, and output a processing result (e.g., a vector) from the fully connected layer 705. In some embodiments, the image input into the convolutional neural network 700 may have a particular size or dimension corresponding to the size or dimension of the fully connected layer 705.

In some embodiments, the convolutional neural network 700 may further include an additional convolutional layer and an adaptive pooling layer (not shown in the figure). The additional convolutional layers and the adaptive pooling layer may be connected in series between the pooling layer 704 and the fully connected layer 705. The adaptive pooling layer may facilitate an adjustment of the size of an input image. Merely for illustration purposes, the adaptive pooling layer may perform adaptive pooling on one or more convolutional feature images output by the additional convolutional layer. Thus an image of any size input into the convolutional neural network 700 may be adjusted to a predetermined size suitable for the fully connected layer 705.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A method implemented on a computing apparatus having at least one processor and at least one computer-readable storage device, the method comprising:
   obtaining a video including a plurality of frames of video data, each frame of the plurality of frames corresponding to a time point;
   sampling one or more frames from the plurality of frames, each pair of consecutive sampled frames being spaced apart by at least one frame of the plurality of frames of the video data;
   identifying, from the one or more sampled frames, a reference frame of video data, the reference frame including a target object that is identified using an identification model;
   determining a start frame including the target object by scanning each of at least a portion of preceding frames of the reference frame sequentially in a first direction in time; and
   determining an end frame including the target object by scanning each of at least a portion of subsequent frames of the reference frame sequentially in a second direction in time, the second direction in time being opposite to the first direction in time.

2. A system, comprising:
   at least one storage device storing a set of instructions; and
   at least one processor configured to communicate with the at least one storage device, wherein when executing the set of instructions, the at least one processor is directed to:
   obtain a video including a plurality of frames of video data, each frame of the plurality of frames corresponding to a time point;
   sample one or more frames from the plurality of frames, each pair of consecutive sampled frames being spaced apart by at least one frame of the plurality of frames of the video data;
   identify, from the one or more sampled frames, a reference frame of video data, the reference frame including a target object that is identified using an identification model;
   determine a start frame including the target object by scanning each of at least a portion of preceding frames of the reference frame sequentially in a first direction in time; and
   determine an end frame including the target object by scanning each of at least a portion of subsequent frames of the reference frame sequentially in a second direction in time, the second direction in time being opposite to the first direction in time.

3. The system of claim 2, wherein the identification model includes a convolutional neural network (CNN) model.

4. The system of claim 2, wherein to identify the target object in the reference frame of the video data using an identification model, the at least one processor is directed to:
   obtain an identification model and training data related to the target object;
   determine a trained identification model by training the identification model with the training data related to the target object; and identify, from the one or more sampled frames, the reference frame including the target object using the trained identification model.

5. The system of claim 2, wherein a preceding frame of the reference frame corresponds to a time point earlier than a reference time point corresponding to the reference frame.

6. The system of claim 2, wherein the first direction in time is from a later time point of the video to an earlier time point of the video.

7. The system of claim 2, wherein a subsequent frame of the reference frame corresponds to a time point later than a reference time point corresponding to the reference frame.

8. The system of claim 2, wherein the second direction in time is from an earlier time point of the video to a later time point of the video.

9. The system of claim 2, wherein to determine a start frame including the target object by scanning each of at least a portion of preceding frames of the reference frame sequentially in a first direction in time, the at least one processor is directed to:
determine a candidate start frame including the target object by scanning each of the at least a portion of the preceding frames of the reference frame along the first direction in time, wherein the target object is not identified in the frame immediately preceding the candidate start frame;
scan each of a first count of preceding frames of the candidate start frame; and
determine the start frame by determining whether the target object appears in any one of the first count of the preceding frames of the candidate start frame.

10. The system of claim 9, wherein to determine the start frame by determining whether the target object appears in any one of the first count of the preceding frames of the candidate start frame further, the at least one processor is directed to:
in response to the determination that the target object appears in at least one of the first count of the preceding frames of the candidate start frame, identify the start frame by scanning each of preceding frames of a first preceding frame of the candidate start frame, the first preceding frame of the candidate start frame corresponding to an earliest time point among the first count of the preceding frames of the candidate start frame in which the target object is identified.

11. The system of claim 9, wherein to determine the start frame by determining whether the target object appears in any one of the first count of the preceding frames of the candidate start frame further, the at least one processor is directed to:
in response to the determination that the target object does not appear in any one of the first count of the preceding frames of the candidate start frame, designate the candidate start frame as the start frame.

12. The system of claim 9, wherein the at least one processor is further directed to:
determine the first count of the preceding frames of the candidate start frame based on at least one criterion including:
a threshold count of the preceding frames of the candidate start frame to be scanned,
a threshold time period within which corresponding preceding frames of the candidate start frame are to be scanned, or
until the target object is identified in one of the preceding frames of the candidate start frame.

13. The system of claim 2, wherein to determine an end frame including the target object by scanning each of at least a portion of subsequent frames of the reference frame sequentially in a second direction in time, the at least one processor is directed to:
determine a candidate end frame including the target object by scanning each of the at least a portion of the subsequent frames of the reference frame along the second direction in time, wherein the target object is not identified in the frame immediately following the candidate end frame;
scan each of a second count of subsequent frames of the candidate end frame; and
determine the end frame by determining whether the target object appears in any one of the second count of the subsequent frames of the candidate end frame.

14. The system of claim 13, wherein to determine the end frame by determining whether the target object appears in any one of the second count of the subsequent frames of the candidate end frame further, the at least one processor is directed to:
in response to the determination that the target object appears in at least one of the second count of the subsequent frames of the candidate end frame, identify the end frame by scanning each of subsequent frames of a second subsequent frame of the candidate end frame, the second subsequent frame of the candidate end frame corresponding to a latest time point among the second count of the subsequent frames of the candidate end frame in which the target object is identified.

15. The system of claim 13, wherein to determine the end frame by determining whether the target object appears in any one of the second count of the subsequent frames of the candidate end frame further, the at least one processor is directed to:
in response to the determination that the target object does not appear in any one of the second count of the subsequent frames of the candidate end frame, designate the candidate end frame as the end frame.

16. The system of claim 13, the at least one processor is further directed to:
determine the second count of the subsequent frames of the candidate end frame based on at least one criterion including:
a threshold count of the subsequent frames of the candidate end frame to be scanned,
a threshold time period within which corresponding subsequent frames of the candidate end frame are to be scanned, or
until the target object is identified in one of the subsequent frames of the candidate end frame.

17. The system of claim 2, where the at least one processor is further directed to:
determine a time period in which the target object appears in the video based on the start frame and the end frame.

18. The system of claim 17, wherein to determine the time period in which the target object appears in the video based on the start frame and the end frame, the at least one processor is directed to:
obtain a start time point corresponding to the start frame including the target object;
obtain an end time point corresponding to the end frame including the target object; and
determine the time period that the target object appears in the video based on the start time point and the end time point.

19. The system of claim 2, wherein to obtain a video including a plurality of frames of video data, the at least one processor is directed to:
    obtain the video including the plurality of frames of video data by communicating with an information provider over a network, wherein the information provider connects to the computing apparatus through the network.

20. A non-transitory computer readable medium, comprising at least one set of instructions, wherein when executed by one or more processors of a computing apparatus, the at least one set of instructions causes the computing apparatus to perform a method, the method comprising:
    obtaining a video including a plurality of frames of video data, each frame of the plurality of frames corresponding to a time point;
    sampling one or more frames from the plurality of frames, each pair of consecutive sampled frames being spaced apart by at least one frame of the plurality of frames of the video data;
    identifying, from the one or more sampled frames, a reference frame of video data, the reference frame including a target object that is identified using an identification model;
    determining a start frame including the target object by scanning each of at least a portion of preceding frames of the reference frame sequentially in a first direction in time; and
    determining an end frame including the target object by scanning each of at least a portion of subsequent frames of the reference frame sequentially in a second direction in time, the second direction in time being opposite to the first direction in time.

* * * * *